US012468672B2

(12) United States Patent
Han et al.

(10) Patent No.: US 12,468,672 B2
(45) Date of Patent: Nov. 11, 2025

(54) DATABASE SCHEMA RELATIONSHIP ANALYSIS SYSTEM

(71) Applicant: International Business Machines Corporation, Armonk, NY (US)

(72) Inventors: Yan Yan Han, Xi'an (CN); Yue Yang, Beijing (CN); Pei Pei Liang, Beijing (CN); Ling Zhuo, Beijing (CN); Yuan Feng, Beijing (CN); Yan Hao Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/595,492

(22) Filed: Mar. 5, 2024

(65) Prior Publication Data

US 2025/0284668 A1  Sep. 11, 2025

(51) Int. Cl.
*G06F 16/21* (2019.01)
*G06F 16/28* (2019.01)

(52) U.S. Cl.
CPC .......... *G06F 16/212* (2019.01); *G06F 16/288* (2019.01)

(58) Field of Classification Search
CPC .............................. G06F 16/212; G06F 16/288
USPC ......................................... 707/803, 740, 807
See application file for complete search history.

(56) References Cited

U.S. PATENT DOCUMENTS

| | | |
|---|---|---|
| 6,374,263 B1 | 4/2002 | Bunger et al. |
| 7,143,108 B1 | 11/2006 | George |
| 7,219,104 B2 | 5/2007 | Schreck et al. |
| 8,141,073 B2 | 3/2012 | Bhandari et al. |

(Continued)

FOREIGN PATENT DOCUMENTS

| | | |
|---|---|---|
| CN | 116097227 A | 5/2023 |
| CN | 117093504 A | 11/2023 |
| CN | 117609021 A | 2/2024 |

OTHER PUBLICATIONS

Mir, Saleem Obaidullah. "Enhanced Method Call Tree for Comprehensive Detection of Symptoms of Cross Cutting" Concerns. Diss. Nova Southeastern University, (2016): 87 pages.

(Continued)

*Primary Examiner* — Giovanna B Colan
(74) *Attorney, Agent, or Firm* — CANTOR COLBURN LLP; Jordan Schiller

(57) ABSTRACT

Computer-implemented methods for a database schema relationship analysis system are disclosed herein. Aspects include receiving a table name associated with a modified table entity in a database of an application. Aspects further include generating an application documentation table association tree using data from application documentation of the application. Aspects also include generating a source code table association tree using a set of data from source code of the application. Aspects further include determining a similarity level by comparing the application documentation table association tree and the source code table association tree. Aspects include generating a message that includes a suggestion to modify a table entity associated with the modified table entity using data from the application documentation table association tree and the source code table association tree in response to determining that the similarity level is within a threshold value.

17 Claims, 10 Drawing Sheets

(56) References Cited

U.S. PATENT DOCUMENTS

| | | | | |
|---|---|---|---|---|
| 8,674,935 | B2* | 3/2014 | Rajamani | A63F 13/358 345/158 |
| 9,037,546 | B2 | 5/2015 | Wong et al. | |
| 9,558,245 | B1 | 1/2017 | Gao et al. | |
| 9,697,239 | B1* | 7/2017 | Buchholz | G06F 16/212 |
| 11,308,320 | B2 | 4/2022 | Lee et al. | |
| 2005/0267915 | A1* | 12/2005 | Zhulong | G06F 16/986 707/E17.118 |
| 2005/0283485 | A1 | 12/2005 | Blaicher et al. | |
| 2009/0300069 | A1 | 12/2009 | Osullivan | |
| 2012/0185483 | A1* | 7/2012 | Shah | G06F 16/212 707/740 |
| 2012/0317474 | A1* | 12/2012 | Parreira | G06F 16/986 715/234 |
| 2014/0115437 | A1 | 4/2014 | Bhatt et al. | |
| 2015/0088592 | A1 | 3/2015 | Marin et al. | |
| 2015/0339269 | A1 | 11/2015 | Konchitsky et al. | |
| 2019/0196949 | A1 | 6/2019 | Venkataraman et al. | |
| 2020/0320130 | A1* | 10/2020 | Korpman | G06F 40/295 |
| 2022/0035821 | A1* | 2/2022 | Chen | G06F 16/24553 |
| 2024/0330167 | A1 | 10/2024 | Duong | |

OTHER PUBLICATIONS

Yu et al., "OB-Tree: Accelerating Data Cleaning in Out-of-Core Column-Store Databases," In 2017 IEEE International Congress on Big Data (2017): pp. 185-192.

Han, et al, "Intelligent Defect Detection in Functional Documents", U.S. Appl. No. 19/178,121, filed Apr. 14, 2025, 35 pages.

Sneed Harry M., "Requirement-Based Testing—Extracting Logical Test Cases from Requirement Documents", Lecture Notes in Business Information Processing, In book: Software Quality: Methods and Tools for Better Software and Systems, Jan. 2018, pp. 60-79.

* cited by examiner

```
deleteChainJobDef(jobid)
  ├─deleteChainJobDefTable(jobid, conn)
  │  ├─getJobExecRunIdTable()
  │  │  └─deleteRunSQLHistoryTable(runid)
  │  ├─getJobExecRunIdTable()
  │  │  └─deleteShellHistoryTable(runid)
  │  └─deleteChainExecHistoryTable()

deleteRunSQLHistoryTable(runid)
  └─deleteRunSQLHistoryLogTable(runid)
```

FIG. 5

| Method Name | Front Stack | Backend Stack | SQL |
|---|---|---|---|
| deleteChainJobDefTable | deleteChainJobDef | Sql | Sql=DELETE FROM JOB_CHAIN WHERE jobid " + jobid |
| deleteChainJobDef | | deleteChainJobDefTable; (0)<br>getJobExecRunIdTable; (1)<br>deleteRunSQLHistoryTable; (1.1)<br>getJobExecRunIdTable; (2)<br>deleteShellHistoryTable; (2.1)<br>deleteChainExecHistoryTable (3) | |
| deleteRunSQLTableHistory | deleteChainJobDef | deleteRunSQLHistoryLogTable(1)<br>Sql2 | Sql="DELETE FROM RUNSQL_HISTORY WHERE runid " + runid |
| deleteRunSQLHistoryLogTable | deleteRunSQLHistory Table | Sql | Sql=DELETE FROM RUNSQL_HISTORY_LOG WHERE runid " + runid; |
| deleteShellHistoryTable | deleteChainJobDef | Sql | Sql=DELETE FROM SHELL WHERE runid " + runid; |

FIG. 6

DATABASE SCHEMA RELATIONSHIP ANALYSIS SYSTEM

BACKGROUND

The present invention generally relates to database analysis, and more specifically, to computer systems, computer-implemented methods, and computer program products for a database schema relationship analysis system.

Applications utilize and store different types of data, such as configuration data, business logic data, and the like. Business logic data is the part of an application where customized algorithms, rules, and commands are used to encode business requirements for how data should be created, stored, and changed. Data can have relationships or dependencies in an application. Applications can use table entities in databases to manage data.

Modification of data, such as deleting or updating data, in one portion of an application can have an effect on a different portion of the application that relied or is related to the modified data. In some cases, the relationship between data is set by a primary key or foreign key, which can make updating associated data straightforward. Data can also be related through business logic. Modification of data related through business logic can be more challenging and can result in dirty data or affect the performance of a related function. For example, if a table entity is deleted from a database of an application, a user with knowledge of data related to the deleted table entity needs to identify associated data and update or delete the data to avoid data corruption. This process can be timely and prone to human error.

SUMMARY

Embodiments of the present invention are directed to a computer-implemented method for a database schema relationship analysis system. According to an aspect of the invention, a computer-implemented method includes receiving a table name associated with a table entity that has been modified in a database of an application. The method also includes generating an application documentation table association tree using a set of data extracted from application documentation of the application using the table name. The method further includes generating a source code table association tree using a different set of data extracted from source code of the application using the table name. The method includes determining a similarity level by comparing the application documentation table association tree and the source code table association tree. The method also includes, in response to determining that the similarity level is within a threshold value, generating a message comprising a suggestion to modify an associated table entity associated with the table entity that has been modified using data from the application documentation table association tree and the source code table association tree.

In one embodiment of the present invention, generating the application documentation table association tree includes generating (Structured Query Language) SQL statements from the set of data extracted from the application documentation. The method also includes identifying table entities associated with the table name from the SQL statements. The method further includes identifying table relationships between the table entities associated with the table name from the set of data extracted from the application documentation. The method also includes generating the application documentation table association tree using the SQL statements, the table entities, and the table relationships.

In one embodiment of the present invention, generating the source code table association tree includes generating a method call relationship graph using the different set of data extracted from the source code. The method further includes generating a method call relationship table using the method call relationship graph. The method includes generating a method call tree using the method call relationship table. The method also includes generating the source code table association tree using the method call tree.

In one embodiment of the present invention, the method includes determining that the similarity level is not within a threshold value. The method also includes transmitting the application documentation table association tree and the source code table association tree to a user device for review.

In one embodiment of the present invention, the method includes displaying the message in the application by invoking an Application Programming Interface (API) callback function.

In one embodiment of the present invention, the application documentation table association tree and the source code table association tree are each a tree structure comprising connected nodes, each of the connected nodes identifies a respective table entity associated with the table name, and connections between the connected nodes identify table relationships between identified table identities associated with the table name.

In one embodiment of the present invention, the message comprises SQL statements from the application documentation table association tree and the source code table association tree.

According to another non-limiting embodiment of the invention, a system having a memory having computer readable instructions and one or more processors for executing the computer readable instructions, the computer readable instructions controlling the one or more processors to perform operations. The operations include receiving a table name associated with a table entity that has been modified in a database of an application. The operations also include generating an application documentation table association tree using a set of data extracted from application documentation of the application using the table name. The operations further include generating a source code table association tree using a different set of data extracted from source code of the application using the table name. The operations include determining a similarity level by comparing the application documentation table association tree and the source code table association tree. The operations also include, in response to determining that the similarity level is within a threshold value, generating a message comprising a suggestion to modify an associated table entity associated with the table entity that has been modified using data from the application documentation table association tree and the source code table association tree.

According to another non-limiting embodiment of the invention, a computer program product for a large language model privacy preservation system is provided. The computer program product includes a computer-readable storage medium having program instructions embodied therewith, the program instructions executable by a processor to cause the processor to perform operations. The operations include receiving a table name associated with a table entity that has been modified in a database of an application. The operations also include generating an application documentation table association tree using a set of data extracted from application documentation of the application using the table name. The operations further include generating a source code table association tree using a different set of data extracted from source code of the application using the table name. The operations include determining a similarity level by comparing the application documentation table association tree and the source code table association tree. The operations also include, in response to determining that the similarity level is within a threshold value, generating a message comprising a suggestion to modify an associated table entity associated with the table entity that has been modified using data from the application documentation table association tree and the source code table association tree.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 is a diagram depicting a method call relationship graph in a database schema relationship analysis system in accordance with one or more embodiments of the present invention;

FIG. 6 is an example method call relationship table of a database schema relationship analysis system in accordance with one or more embodiments of the present invention;

DETAILED DESCRIPTION

Figure 1:
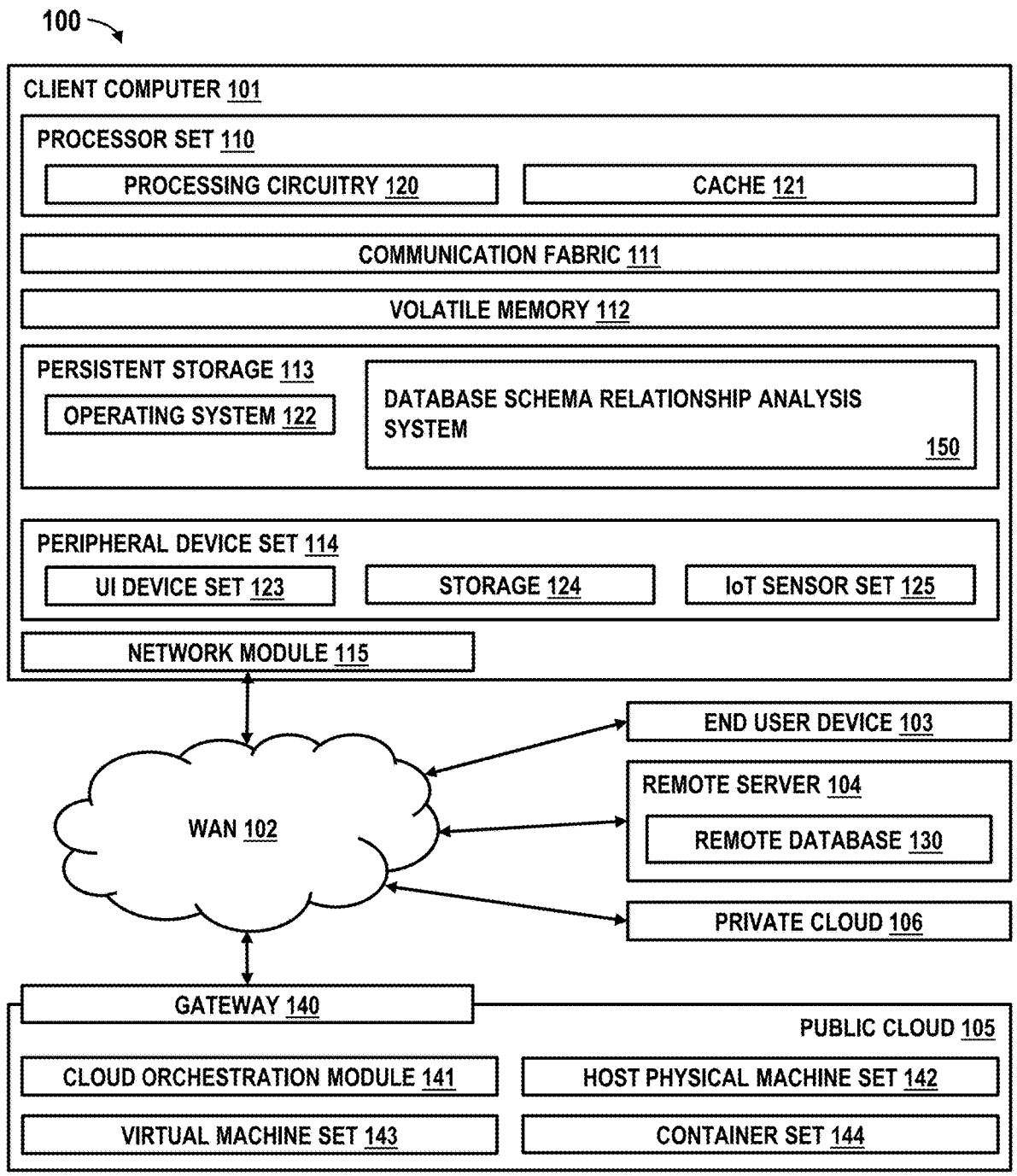
FIG. 1 depicts a block diagram of an example computer system for use in conjunction with one or more embodiments of the present invention.

Disclosed herein are methods, systems, and computer program products for a database schema relationship analysis system. As discussed above, applications can store different types of data in structures, such as a table entity. A table entity is a data structure that can store and organize data within a database. Modifying data, such as deleting or updating data, in one portion of an application can have an effect on a different portion of the application that relied on, or is related to, the modified data. Such modifications to the data can result in dirty data or poor performance of the application.

The systems and methods described herein are directed to a database schema relationship analysis system. By leveraging the database schema of an application, the system can detect a modification to a table entity of the application and identify table entities and table relationships related to the modified table entity. In some embodiments, the system generates a table association tree from table entities and table relationships extracted from segments of the application documentation of the application and a second table association tree from segments of the source code of the application.

A table association tree is a tree structure that reflects table entities associated with a modified table. Nodes of the table association tree represent the table entities related to the modified table entity. The table association tree also reflects the different table relationships between the table entities. In some embodiments, the table association tree can include different types of nodes for the table entities. For example, the nodes of the table association tree can include data indicating the type of SQL action that needs to be taken upon the table entity. For example, some nodes can include data indicating that an SQL DEL or GET command is associated with the table entity. In some embodiments, the table association tree is structured in a way to quickly identify tables entities associated with the modified table entity and to extract SQL statements that correspond to the respective table entity.

In some embodiments, the system compares the table association tree derived from the application documentation and the table association tree derived from the source code of the application. By comparing the table association trees and determining that they are within a given value of similarity, the system ensures that the table entities and table relationships in the application documentation and the source code are consistent. Upon determining that the table association trees are similar, the system generates a message that includes suggested next steps to modify the identified table entities related to the modified table entity and provide SQL statements that can be used to modify the table entities. In some embodiments, the message is displayed in the application using a callback application programming interface (API) functionality.

If the system determines that the table associations trees are not similar, i.e., within a threshold value, a notification is generated and all or some of the table association trees are displayed to the user. The table association trees can be used to compare the application documentation and source code of the application so that source code can be easily updated to fix errors and application documentation can be easily refined.

The systems and methods described herein can be applied to different types of databases, such as relational and non-relational databases. Additionally, the system can be used to manage cascading deleting and cascading updating scenarios in an application. If the database is near its capacity, the system can locate redundant data in table entities and facilitate efficient database management and performance optimization. In some embodiments, the system can be used to deter accidental deletion of table entity data from the database.

In some embodiments, the system and methods described herein can be made into a plugin to the application which could automatically display the message in the application as a table entity is modified.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as extracting table entities and table relationships from application documentation and source code, identifying relationships between table entities, and modifying data in related table entities by a database schema relationship analysis system 150. In addition to the database schema relationship analysis system 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the database schema relationship analysis system 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Client computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the database schema relationship analysis system 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in the database schema relationship analysis system 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
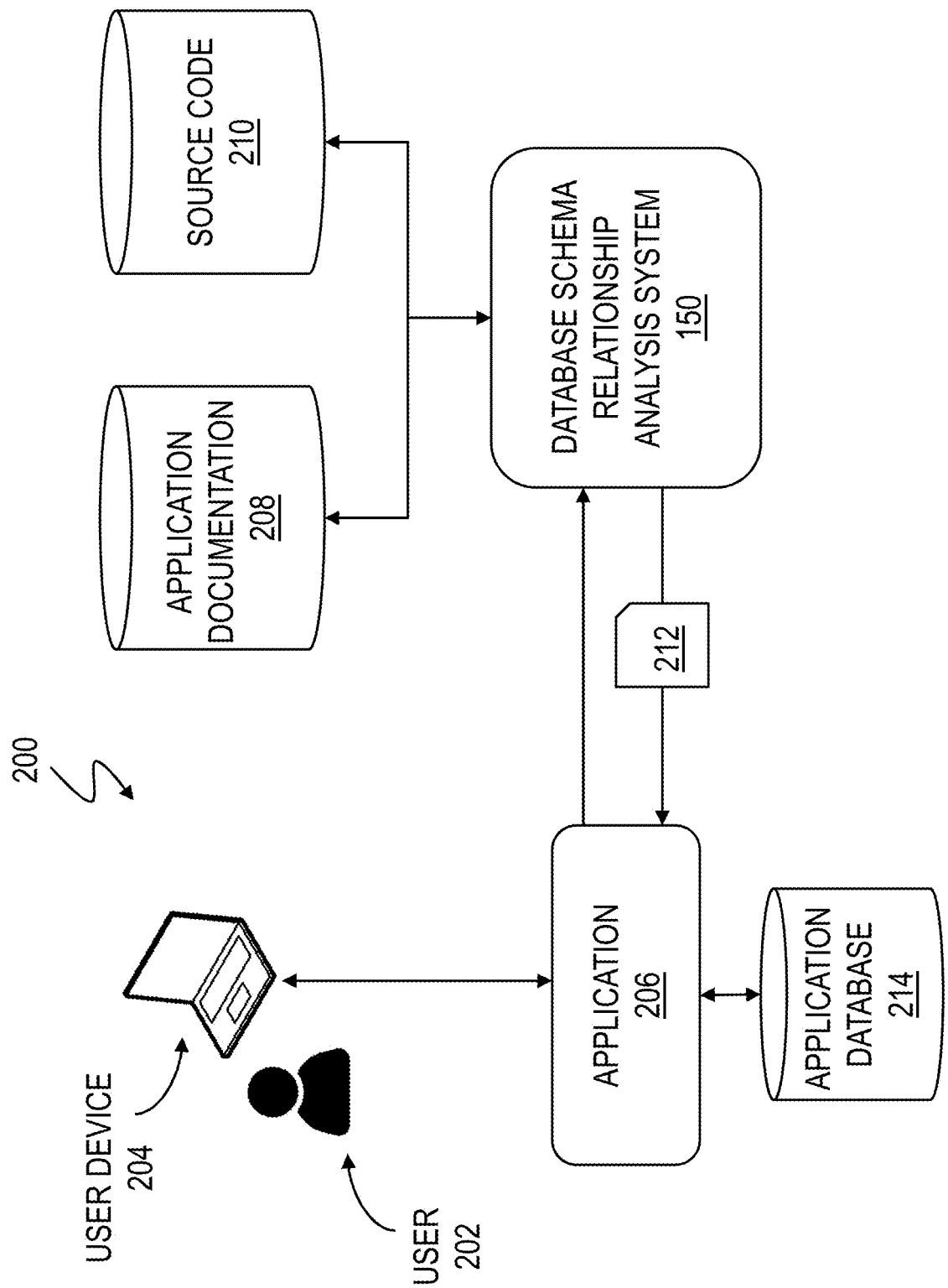
FIG. 2 is a data flow diagram depicting the flow of data in a system that includes a database schema relationship analysis system in accordance with one or more embodiments of the present invention.

Referring now to FIG. 2, a data flow diagram depicting the flow of data in system 200 that includes a database schema relationship analysis system 150 in accordance with one or more embodiments of the present invention. A user 202 interacts with a user device 204, such as a desktop computer, laptop computer, cell phone, tablet, or the like, to interact with an application 206. In some embodiments, the application 206 is connected to an application database 214. The application database stores different types of data used by the application 206 that can be stored as table entities or the like. In some embodiments, the user 202 makes a modification to data in the application database 214 of the application 206, such as deleting a table entity. The database schema relationship analysis system 150 detects the modification in the application database 214 made by the user 202. In response to detecting the modification, the database schema relationship analysis system 150 identifies the table name of the table entity that was deleted by the user 202. The database schema relationship analysis system 150 identifies table entities that are related to the deleted table entity from the application database 214 using the application documentation 208 and source code 210 of the application 206. The database schema relationship analysis system 150 generates and transmits to the application 206, a message 212 that identifies suggested next steps to update the related table entities and related SQL statements for modifying the table entities associated with the deleted table entity.

Figure 3:
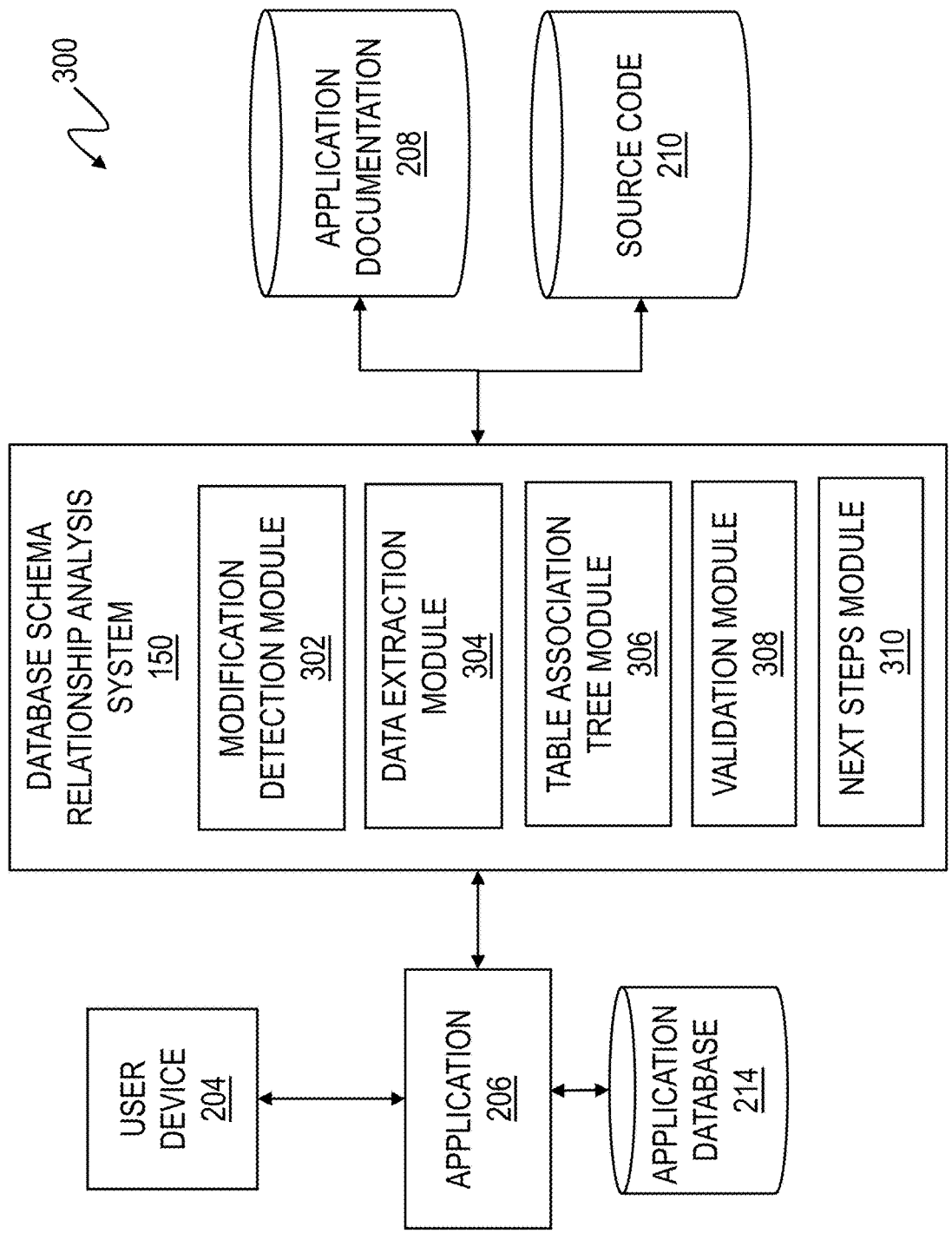
FIG. 3 is a block diagram of a system for a database schema relationship analysis system in accordance with one or more embodiments of the present invention.

Referring now to FIG. 3, a system 300 for a database schema relationship analysis system 150 in accordance with one or more embodiments of the present invention is shown. In exemplary embodiments, the system 300 includes a database schema relationship analysis system 150 that may be embodied in a computer 101, such as the one shown in FIG. 1. As illustrated, the system 300 includes the database schema relationship analysis system 150 that is associated with one or more applications 206 that are accessed by one or more user devices 204. The application 206 can utilize one or more application databases 214 to store data that needed or generated by the application 206. The database schema relationship analysis system 150 is configured to detect a modification of data in the application database 214 of the application 206 made by the user device 204 and identify table entities related to the modified data. The database schema relationship analysis system 150 includes a modification detection module 302, a data extraction module 304, a table association tree module 306, a validation module 308, and a next steps module 310. The database schema relationship analysis system 150 interacts with application documentation 208 of the application 206 and source code 210 of the application 206.

A user device 204 interacts with an application 206 and can modify data in a table entity of the application database 214, such as updating or deleting a table entity stored in the application database 214 of the application 206. The modification detection module 302 of the database schema relationship analysis system 150 detects a modification of data in the application database 214 and identifies a table name of the table entity that was modified in the application database 214.

The data extraction module 304 receives the table name and extracts table entities related to the modified table entity of the application database 214 from the application documentation 208 and source code 210 of the application 206. Table entities and table relationships are extracted from the application documentation 208 and the source code 210 using known techniques of machine learning and/or artificial intelligence. The extracted table entities related to the modified table entity are transmitted to the table association tree module 306.

The table association tree module 306 receives the table entities and table relationships identified by the data extraction module 304 and generates an application documentation table association tree and a source code table association tree, further discussed below. The table association tree module 306 transmits the application documentation table association tree and the source code table association tree to the validation module 308.

The validation module 308 receives the application documentation table association tree and the source code table association tree and determines a level of similarity between them. If the level of similarity is within a threshold value, the validation module 308 transmits the application documentation table association tree and the source code table association tree to the next steps module 310, which then generates a message 212 that includes a suggestion to modify table entities associated with the modified table entity and related SQL statements for modifying the table entities associated with the deleted table entity. The message 212 is displayed in the application 206.

If the level of similarity is not within a threshold value, the validation module 308 transmits some or all of the application documentation table association tree and the source code table association tree to the application 206 for further review by a user 202.

Figure 4:
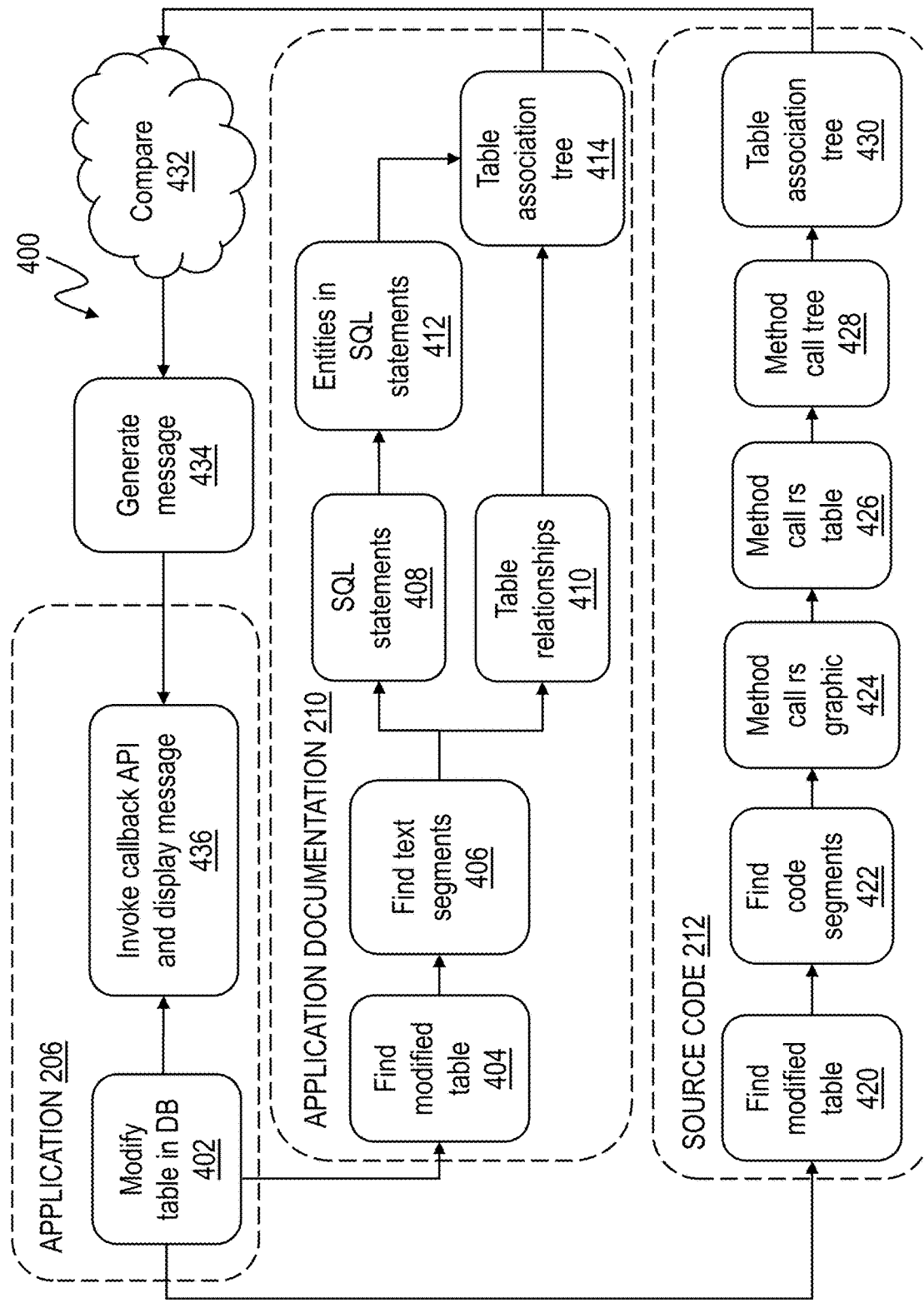
FIG. 4 is a data flow diagram depicting a detailed workflow of a database schema relationship analysis system in accordance with one or more embodiments of the present invention.

Now referring to FIG. 4, a data flow diagram depicting a detailed workflow 400 of a database schema relationship analysis system in accordance with one or more embodiments of the present invention is shown. At block 402, data in a table of the application database 214 of the application 206 is modified by a user 202 using a user device 204. The modification detection module 302 of the database schema relationship analysis system 150 detects the modification of the table entity and identifies the table name of the modified table entity.

For example, the user 202 deletes a table entity named "JOB_CHAIN" from an application database 214 of an application 206. The modification detection module 302 detects that a table entity has been deleted and determines that the table name of the deleted table entity is "JOB_CHAIN" and transmits the table name to the data extraction module 304.

At block 404, the data extraction module 304 receives the name of the modified table entity and finds the table name of the modified table entity in the application documentation 208. At block 406, the data extraction module 304 identifies text segments of the application documentation 208 that are related to the table name of the modified table entity in the application documentation 208, as depicted in Table 1.

TABLE 1

| | Example Application Documentation |
|---|---|
| Identified Text Segments | . . . If you would like to delete the chain job definition data, please delete the record from the table JOB_CHAIN according to the jobid; And at the same time, you also need to delete the record of sub jobs' history data from table RUNSQL_HISTORY and SHELL_HISTORY according to the runid which can be gotten from the table JOB_CHAIN_HISTORY. Finally, need to delete the chain job history records from the table JOB_CHAIN_HISTORY according to the jobid; . . . |

At block 408, using known techniques of machine learning and/or artificial intelligence, the data extraction module 304 generates SQL statements from the identified text segments and further identifies table entities related to the modified table entity from the SQL statements in block 412. For example, as shown in Table 1, the table entity JOB_CHAIN is related to tables RUNSQL_HISTORY, SHELL_HISTORY, and JOB_CHAIN_HISTORY. At block 410, the data extraction module 304 identifies table relationships of the table entities related to the table name. At block 414, the table association tree module 306 receives the table entities, table relationships, and SQL statements and generates an application documentation table association tree.

At block 420, the data extraction module 304 receives the table name of the modified table entity and identifies the table name of the modified table entity in the source code 210. At block 422, the data extraction module 304 identifies text segments of the source code 210 that are related to the table name.

In one example embodiment, the data extraction module 304 identifies a portion of source code 210, such as the source code displayed in Table 2, that is related to the table name (e.g., "JOB_CHAIN") of the modified table entity of the application database 214.

TABLE 2

| Example Source Code |
|---|
| //chainFile |
| deleteChainJobDefTable( ) {<br>  String sql = "DELETE FROM JOB_CHAIN WHERE jobid " + jobid;<br>  run sql;<br>}<br>getJobExecRunIdTable( );<br>deleteChainJobDef(jobid) {<br>  deleteChanJobDefTable(jobid, conn);<br>  sqlRunidList =getJobExecRunIdTable( );<br>  for( ... ){<br>    String sqlRunid = sqlRunidList[i];<br>    deleteRunSQLHistoryTable(sqlRunid);<br>  }<br>  shellidList = getJobExecRunIdTable( );<br>  for( ... ) {<br>    String shellid = shellidList[i];<br>    deleteShellHistoryTable(shellid);<br>  }<br>  deleteChainExecHistoryTable( );<br>}<br>//runsqlFile: |
| deleteRunSQLHistoryTable(String runid) {<br>  deleteRunSQLHistoryLogTable( );<br>  sql2 = "DELETE FROM RUNSQL_HISTORY WHERE runid " + runid; run sql2;<br>}<br>deleteRunSQLHistoryLogTable( ) {<br>  sql1 = "DELETE FROM RUNSQL_HISTORY_LOG WHERE runid " + runid; run sql1;<br>}<br>//shellFile: |
| deleteShellHistoryTable(String runid) {<br>  sql = "DELETE FROM SHELL WHERE runid " + runid;<br>  run sql;<br>} |

At block 424, a method call relationship graph, such as the method call relationship graph 500 depicted in FIG. 5, is generated by data extraction module 304. A method call relationship graph a graphical representation of the relationships between different methods or functions calls within a program. As shown in the method call relationship graph 500 in FIG. 5, the methods or functions in the identified source code segment are extracted and placed in a graphical representation where the lines represent the relationships between the methods or functions from the identified segment of the source code 210.

At block 426, the data extraction module 304 generates a method call relationship table, such as the method call relationship table 600 depicted in FIG. 6. The data extraction module 304 generates or builds the method call relationship table 600 to identify relationships between the methods or functions of the identified segment of the source code 210 and organize the information associated with each table method or function identified, including SQL statements of each function or method.

Figure 7:
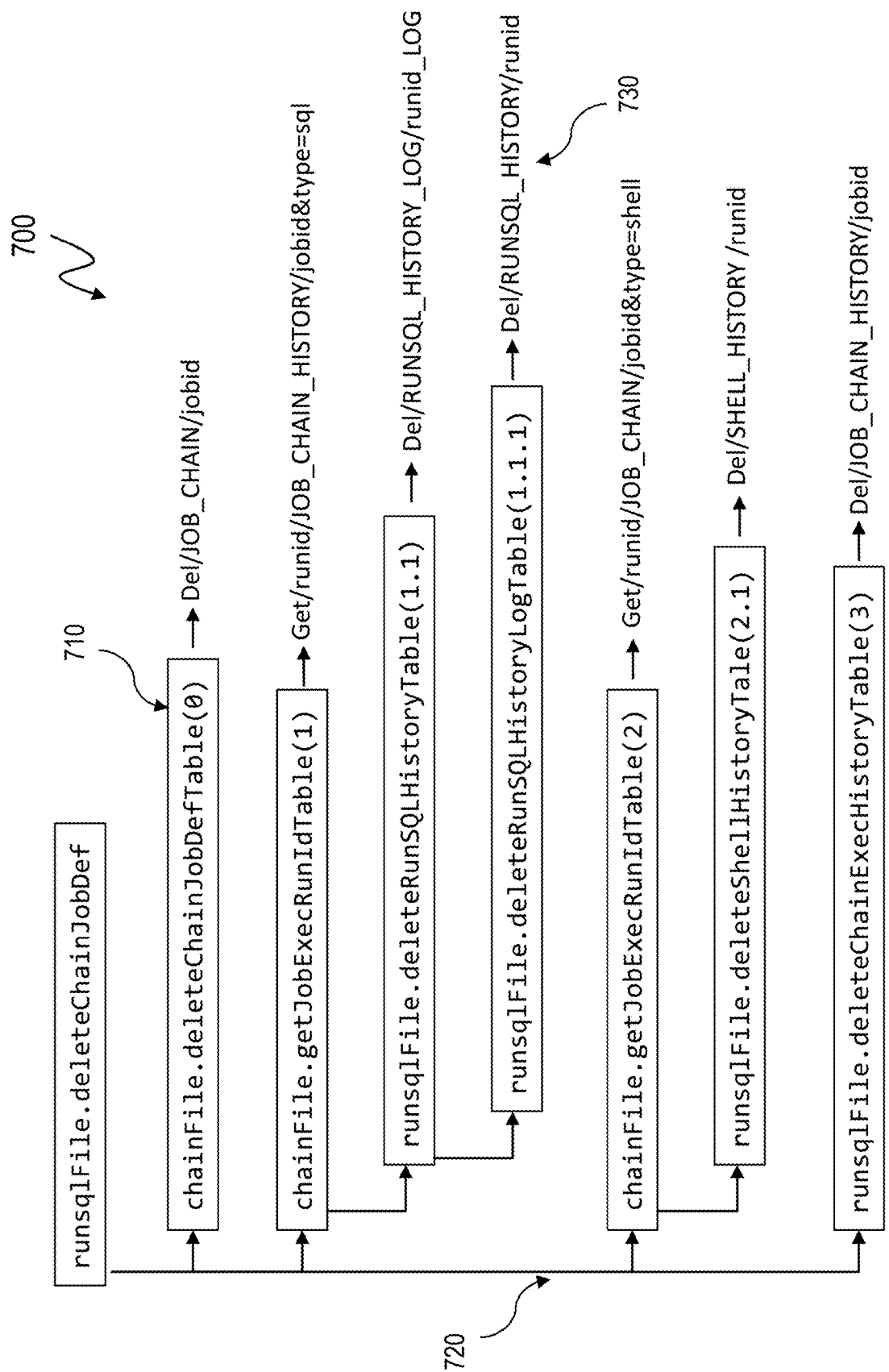
FIG. 7 is a diagram depicting a method call tree with SQL entity nodes in a database schema relationship analysis system in accordance with one or more embodiments of the present invention.
Figure 8:
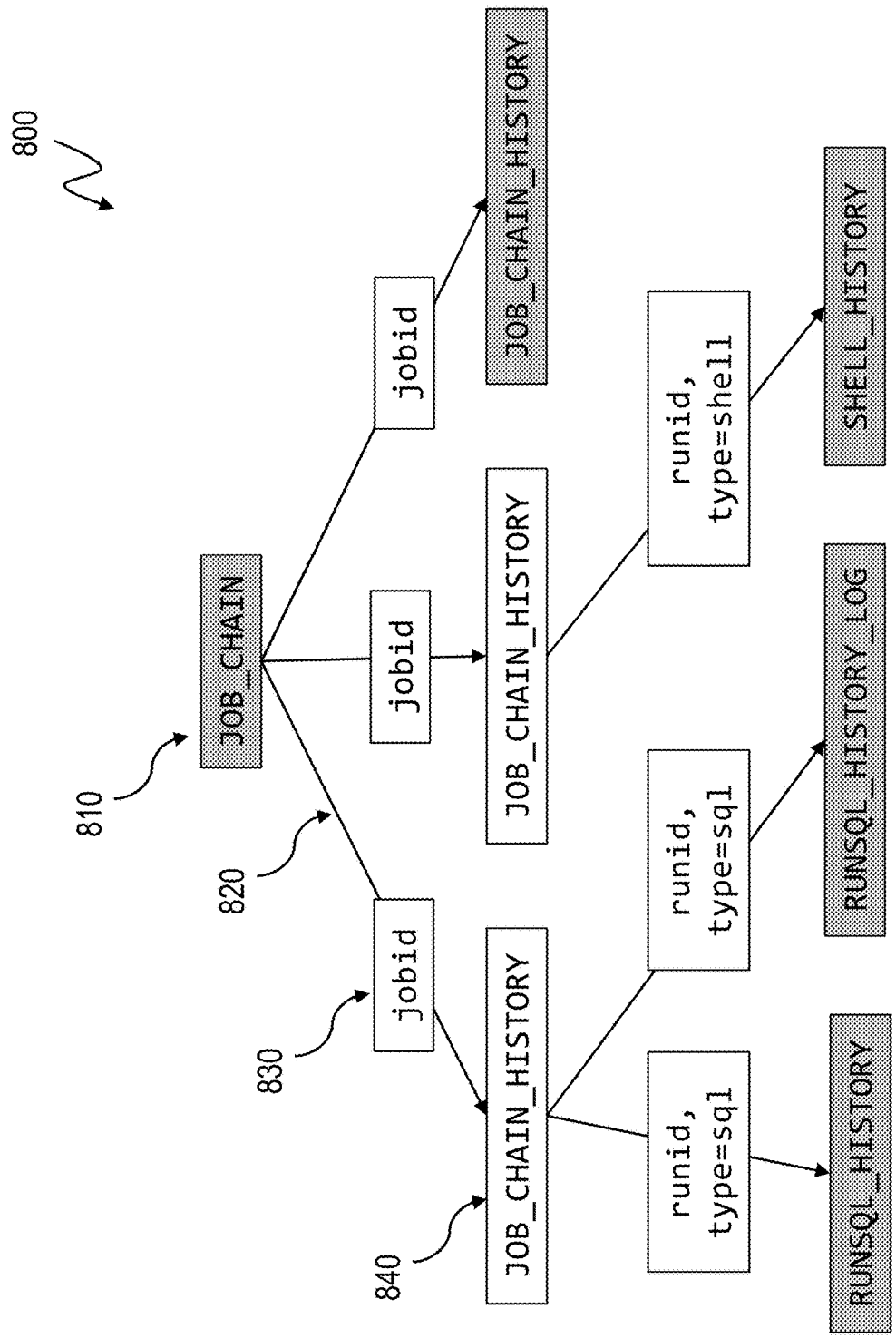
FIG. 8 is a diagram depicting a table association tree in a database schema relationship analysis system in accordance with one or more embodiments of the present invention.

At block 428, the data extraction module 304 generates a method call tree, such as the method call tree 700 depicted in FIG. 7. The method call tree 700 is a tree structure generated from the method call relationship table 600 where the nodes 710 represent the methods or functions associated with the modified table entity, the connections 720 between the nodes 710 represent the relationships between the methods or functions, and SQL entity nodes 730 that contain SQL statements corresponding to the method or function nodes 710. At block 430, the table association tree module 306 receives the method call tree 700 and generates a source code table association tree, such as the table association tree 800 depicted in FIG. 8. The table association tree 800 is a tree structure that has nodes representing the table entities associated with the table name of the modified table entity. In some embodiments, the table association tree 800 can have multiple categories of nodes, such as 810 and 840 that indicate the type of action, such as an SQL action, associated with the table entity associated with the node. For example, the shaded nodes 810 in FIG. 8, can represent the SQL command DEL for the table entity represented by the node, while the unshaded nodes 840, can represent the SQL command GET for the table entity represented by the node. The connections 820 between the nodes represent the table relationships between the table entities. The nodes 810 and 840 can include data indicating the type of SQL action that needs to be taken upon the table entity it represents. Additionally, the table association tree 800 includes input objects 830 that represent the data passed between the table entities. The table association tree 800 is structured in such a manner to quickly generate SQL statements corresponding a path of the tree structure and to identify table entities related to the modified table structure that need to be modified.

Figure 9:
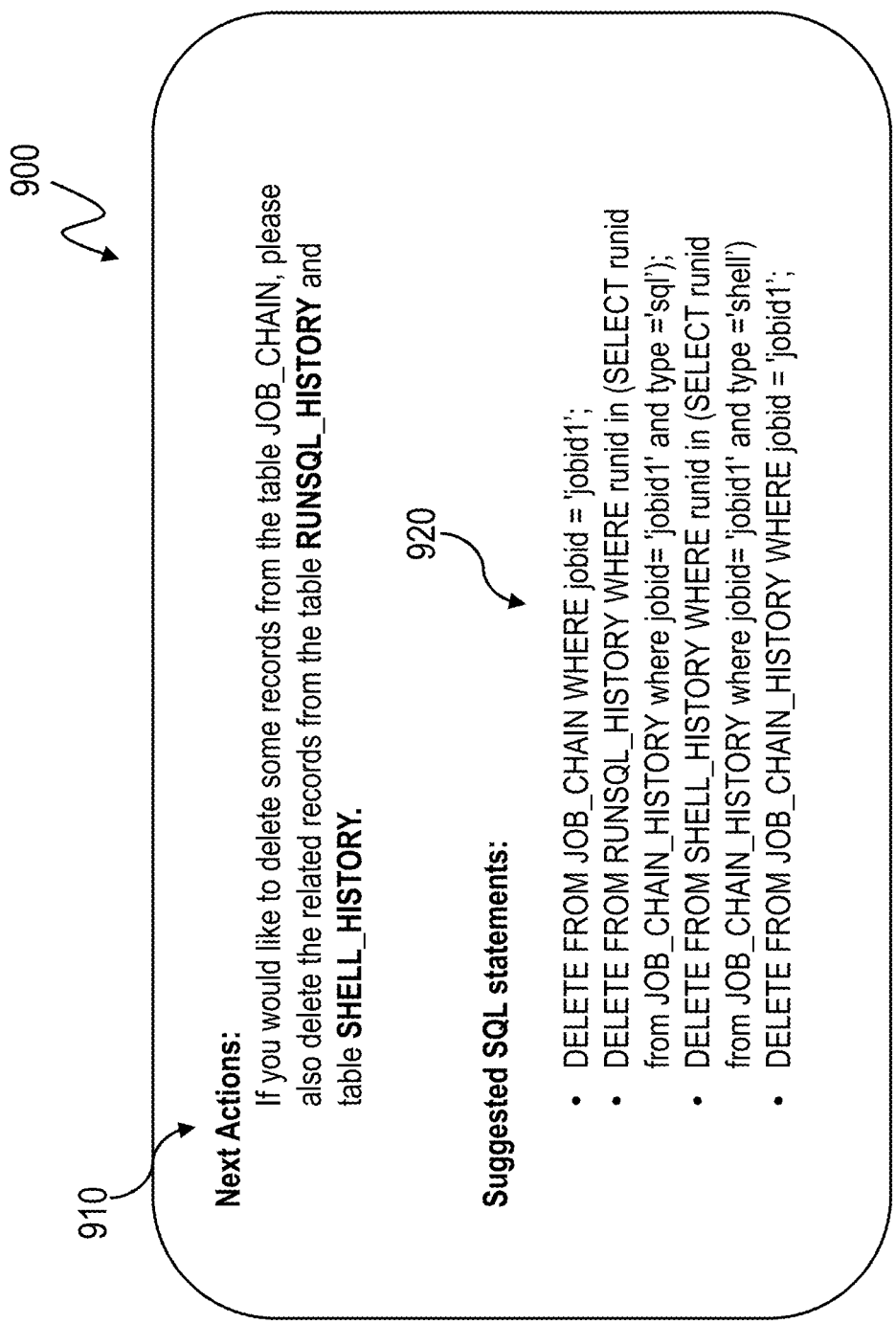
FIG. 9 is a diagram depicting a message generated by a database schema relationship analysis system in accordance with one or more embodiments of the present invention.

At block 432, the validation module 308 receives the application documentation table association tree and the source code table association tree. The validation module 308 compares the application documentation table association tree and the source code table association tree. In some embodiments, the validation module 308 generates a similarity score of the application documentation table association tree and the source code table association tree using known techniques of comparison. In one example embodiment, the validation module 308 compares the number of nodes and their position in the tree and generates a score reflecting the similarity of the two tree structures. The validation module 308 compares the similarity level with a threshold value. In some embodiments, the threshold value is a value provided by an administrator of the database schema relationship analysis system 150. If the similarity level is within the given threshold value, then at block 434 the next steps module 310 generates a message 212, such as the example message 900 depicted in FIG. 9. As shown in the example message 900, a suggestion for next actions 910 is displays a recommended next step to modify table entities associated with the modified table entity of the application database 214 of the application 206. The example message 900 also includes SQL statements 920 for modifying the table entities associated with the modified table entity. At block 436, the application 206 invokes a callback API to display the message 212 generated at block 434 to display the message in the application 206.

Figure 10:
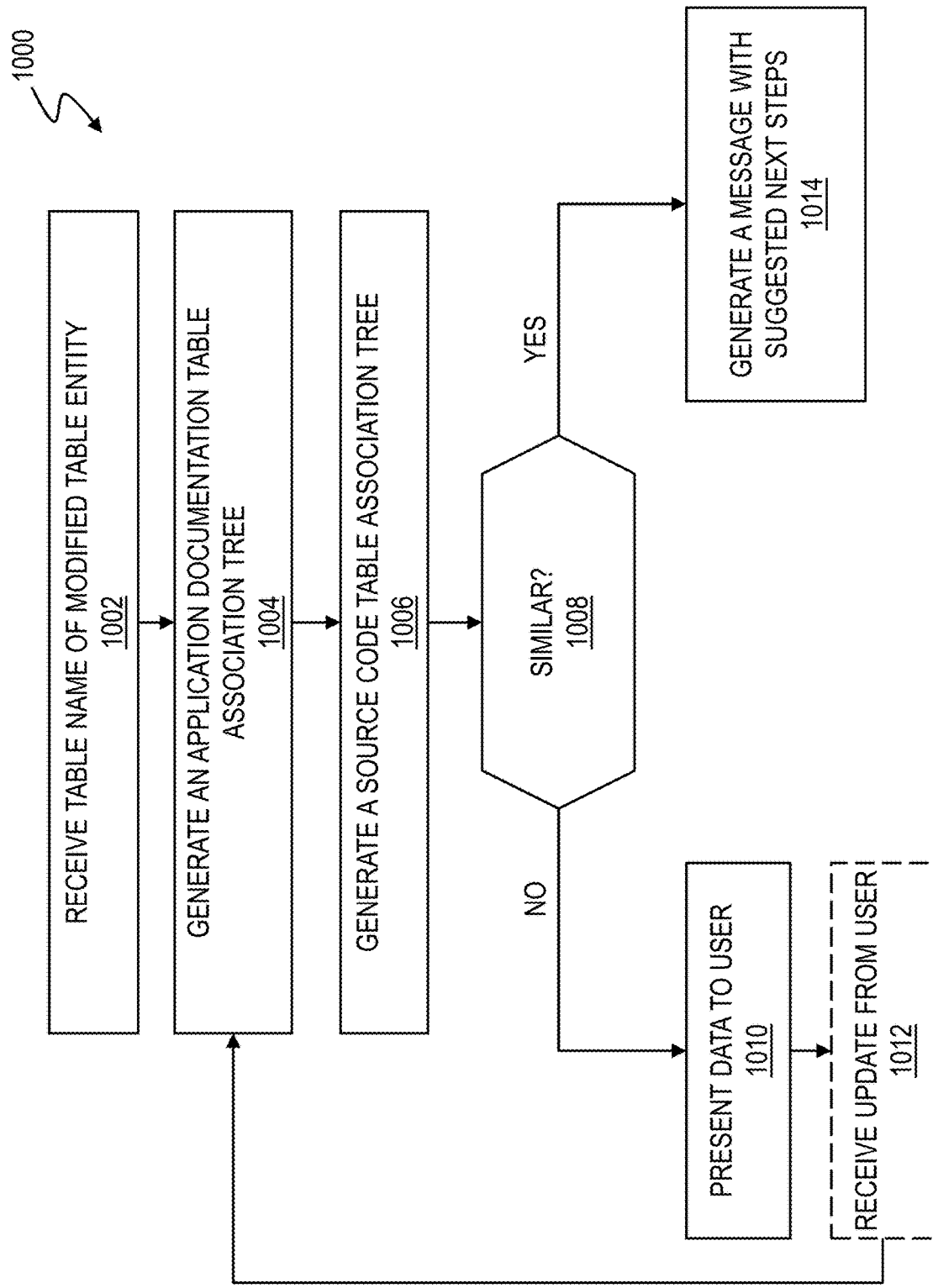
FIG. 10 is a flowchart of a method for identifying related table entities and table relationships by database schema relationship analysis system in accordance with one or more embodiments of the present invention.

Referring now to FIG. 10, a flowchart of a method 1000 for identifying related table entities and table relationships by database schema relationship analysis system 150 in accordance with one or more embodiments of the present invention is shown. The method 1000 begins at block 1002 by receiving a table name of a modified table entity of an application database 214 of an application 206. In some embodiments, the modification detection module 302 detects a modification made to a table entity of an application database 214 of an application 206. The modification detection module 302 detects any deletions, additions, updates, or other modification made to a table entity of the application database 214 of the application 206. The modification detection module 302 identifies the table name of the modified table entity and transmits the table name to the data extraction module 304 of the database schema relationship analysis system 150.

Next at block 1004, an application documentation association tree is generated. In some embodiments, the data extraction module 304 of database schema relationship analysis system 150, receives the table name of the modified table entity of the application database 214 of the application 206 from the modification detection module 302 and extracts table entities and table relationships associated with the table name from the application documentation 208 associated with the application 206. In some embodiments, the data extraction module 304 finds the table name in the application documentation 208 and finds text segments of the application documentation 208 that have table entities associated with the table name. In some embodiments, the data extraction module 304, using known methods of AI and/or machine learning, can generate SQL statements from the text segments of the application documentation 208 and identifies table entities from the SQL statements as well as table relationships of table entities associated with the table name. The table association tree module 306 generates the application documentation table association tree using the SQL statements, table relationships, and table entities associated with the table.

Next at block 1006, a source code table association tree is generated. In some embodiments, the data extraction module 304 finds the table name in the source code 210 associated with the application 206 and finds code segments of the source code 210 that contain the table name. The data extraction module 304 generates a method call relationship graph 500 that includes all the methods or functions associated with the table name from the code segments of the source code 210. The data extraction module 304 generates a method call relationship table 600 based on the method call relationship graph 500 to reflect the relationships between the methods and functions that are use or call table entities associated with the table name and identify SQL statements associated with each of the methods or functions. The data extraction module 304 uses the method call relationship table 600 to generate or construct a method call tree 700 that reflects the relationships of the functions and methods associated with the table name and include SQL entity nodes 730 that correspond to the functions or methods of the method call tree. In some embodiments, the table association tree module 306 generates the source code table association tree using the method call tree.

Next at block 1008, the application documentation table association tree and the source code table association tree are compared. In some embodiments, the validation module 308 compares the application documentation table association tree and the source code table association tree and generates a similarity level. The validation module 308 uses any known method of generating a score to reflect a level of similarity between tree structures. For example, the validation module 308 can use a technique that compares the number of nodes in the tree structures and position of nodes in the tree structure in a calculation to generate a score to reflect the similarity of the structures. The validation module 308 can compare the similarity level of the application documentation table association tree and the source code table association tree to a threshold value. The threshold value can be a predetermined value. In some embodiments, the threshold value can be designated by an administrator of the database schema relationship analysis system 150. The validation module 308 can compare the similarity level with the threshold value. If the similarity level is not within a threshold value, then the method 1000 proceeds to block 1010. If the similarity level is within a threshold value, then the method 1000 proceeds to block 1014.

Next at block 1010, in response to determining that the similarity level is not within a threshold value, the next steps module 310 generates a notification to display in the application 206. In some embodiments, the next steps module 310 includes the application documentation table association tree and the source code table association tree in the notification. In some embodiments, the next steps module 310 highlights the portions of the application documentation table association tree and the source code table association tree that are not similar. In some embodiments, the next steps module 310 transmits the segments of the application documentation table association tree and the source code table association tree that are dissimilar. The next steps module 310 can include additional information about the trees, such as the location in the application documentation 208 and/or the source code 210 that contributed to determining that the similarity level is not within the threshold value.

Next at optional block 1012, in some embodiments, the next steps module 310 received an update from the user 202. In some embodiments, the user 202 updates the application documentation 208 and/or source code 210 and transmits a request to the database schema relationship analysis system 150 to redo the database schema relationship analysis using the updated application documentation 208 and/or source code 210. The next steps module 310 initiates a second analysis and transmits the request to the data extraction module 304, where the method 1000 proceeds back to block 1004 and reiterates the process.

If at block 1008, the validation module 308 determines that the similarity level is within the threshold value, then at block 1014, the next steps module 310 generates a message 212 with suggested next steps to display in the application 206. In some embodiments, the message 212 includes a recommended next step to modify table entities associated with the modified table entity of the application database 214 of the application 206 and includes SQL statements for modifying the table entities associated with the table name. In some embodiments, the next steps module 310 invokes a callback API in the application 206 to display the message 212 in the application 206.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving a table name associated with a table entity that has been modified in a database of an application;
   generating an application documentation table association tree using a set of data extracted from application documentation of the application using the table name, wherein the application documentation table association tree includes (Structured Query Language) SQL statements generated from text segments of the application documentation that contain the table name;
   generating a source code table association tree using a different set of data extracted from source code of the application using the table name;
   determining a similarity level by comparing a structure and relationships of nodes in the application documentation table association tree and the source code table association tree; and
   in response to determining that the similarity level is within a threshold value, generating a message comprising a suggestion to modify an associated table entity associated with the table entity that has been modified using data from the application documentation table association tree and the source code table association tree,
   wherein the source code table association tree is generated by:
      generating a method call relationship graph using code segments of the source code containing the table name;
      generating a method call relationship table from the method call relationship graph;
      generating a method call tree from the method call relationship table; and
      generating the source code table association tree from the method call tree.

2. The computer-implemented method of claim 1, wherein generating the application documentation table association tree comprises:
   generating SQL statements from the set of data extracted from the application documentation;
   identifying table entities associated with the table name from the SQL statements;
   identifying table relationships between the table entities associated with the table name from the set of data extracted from the application documentation; and
   generating the application documentation table association tree using the SQL statements, the table entities, and the table relationships.

3. The computer-implemented method of claim 1, further comprising:
   determining that the similarity level is not within the threshold value; and
   transmitting the application documentation table association tree and the source code table association tree to a user device for review.

4. The computer-implemented method of claim 1, further comprising:
   displaying the message in the application by invoking an Application Programming Interface (API) callback function.

5. The computer-implemented method of claim 1, wherein
   the application documentation table association tree and the source code table association tree are each a tree structure comprising connected nodes;
   each of the connected nodes identifies a respective table entity associated with the table name; and
   connections between the connected nodes identify table relationships between identified table identities associated with the table name.

6. The computer-implemented method of claim 1, wherein the message comprises SQL statements from the application documentation table association tree and the source code table association tree.

7. A system comprising:
   a memory having computer readable instructions; and
   one or more processors for executing the computer readable instructions, the computer readable instructions controlling the one or more processors to perform operations comprising:
      receiving a table name associated with a table entity that has been modified in a database of an application;
      generating an application documentation table association tree using a set of data extracted from application documentation of the application using the table name;
      generating a source code table association tree using a different set of data extracted from source code of the application using the table name, wherein the application documentation table association tree includes (Structured Query Language) SQL statements generated from text segments of the application documentation that contain the table name;
      determining a similarity level by comparing a structure and relationships of nodes in the application documentation table association tree and the source code table association tree; and
      in response to determining that the similarity level is within a threshold value, generating a message comprising a suggestion to modify an associated table entity associated with the table entity that has been modified using data from the application documentation table association tree and the source code table association tree, wherein the source code table association tree is generated by:
    generating a method call relationship graph using code segments of the source code containing the table name;
    generating a method call relationship table from the method call relationship graph;
    generating a method call tree from the method call relationship table; and
    generating the source code table association tree from the method call tree.

8. The system of claim 7, wherein the operations to generate the application documentation table association tree further comprise:
    generating the application documentation table association tree comprises:
    generating SQL statements from the set of data extracted from the application documentation;
    identifying table entities associated with the table name from the SQL statements;
    identifying table relationships between the table entities associated with the table name from the set of data extracted from the application documentation; and
    generating the application documentation table association tree using the SQL statements, the table entities, and the table relationships.

9. The system of claim 7, wherein the operations further comprise:
    determining that the similarity level is not within a threshold value; and
    transmitting the application documentation table association tree and the source code table association tree to a user device for review.

10. The system of claim 7, wherein the operations further comprise:
    displaying the message in the application by invoking an Application Programming Interface (API) callback function.

11. The system of claim 7, wherein:
    the application documentation table association tree and the source code table association tree are each a tree structure comprising connected nodes;
    each of the connected nodes identifies a respective table entity associated with the table name; and
    connections between the connected nodes identify table relationships between identified table identities associated with the table name.

12. The system of claim 8, wherein the message comprises SQL statements from the application documentation table association tree and the source code table association tree.

13. A computer program product comprising a computer readable storage medium having program instructions embodied therewith, the program instructions executable by a processor to cause the processor to perform operations comprising:
    receiving a table name associated with a table entity that has been modified in a database of an application;
    generating an application documentation table association tree using a set of data extracted from application documentation of the application using the table name, wherein the application documentation table association tree includes (Structured Query Language) SQL statements generated from text segments of the application documentation that contain the table name;
    generating a source code table association tree using a different set of data extracted from source code of the application using the table name;
    determining a similarity level by comparing a structure and relationships of nodes in the application documentation table association tree and the source code table association tree; and
    in response to determining that the similarity level is within a threshold value, generating a message comprising a suggestion to modify an associated table entity associated with the table entity that has been modified using data from the application documentation table association tree and the source code table association tree,
    wherein the source code table association tree is generated by:
        generating a method call relationship graph using code segments of the source code containing the table name;
        generating a method call relationship table from the method call relationship graph;
        generating a method call tree from the method call relationship table; and
    generating the source code table association tree from the method call tree.

14. The computer program product of claim 13, wherein the operations to generate the application documentation table association tree further comprise:
    generating the application documentation table association tree comprises:
    generating SQL statements from the set of data extracted from the application documentation;
    identifying table entities associated with the table name from the SQL statements;
    identifying table relationships between the table entities associated with the table name from the set of data extracted from the application documentation; and
    generating the application documentation table association tree using the SQL statements, the table entities, and the table relationships.

15. The computer program product of claim 13, wherein the operations further comprise:
    determining that the similarity level is not within the threshold value; and
    transmitting the application documentation table association tree and the source code table association tree to a user device for review.

16. The computer program product of claim 13, wherein the operations further comprise:
    displaying the message in the application by invoking an Application Programming Interface (API) callback function.

17. The computer program product of claim 13, wherein:
    the application documentation table association tree and the source code table association tree are each a tree structure comprising connected nodes;
    each of the connected nodes identifies a respective table entity associated with the table name; and
    connections between the connected nodes identify table relationships between identified table identities associated with the table name.

* * * * *